(12) United States Patent
Ishikawa et al.

(10) Patent No.: US 8,636,420 B2
(45) Date of Patent: Jan. 28, 2014

(54) ROLLER BEARING AND BEARING STRUCTURE

(75) Inventors: Shiro Ishikawa, Sao Paulo (BR); Ryutaro Oka, Yokkaichi (JP); Masanori Ueno, Shanghai (CN); Yoshimitsu Hirasawa, Kuwana (JP)

(73) Assignee: NTN Corporation, Osaka (JP)

( * ) Notice: Subject to any disclaimer, the term of this patent is extended or adjusted under 35 U.S.C. 154(b) by 783 days.

(21) Appl. No.: 11/918,469

(22) PCT Filed: Apr. 5, 2006

(86) PCT No.: PCT/JP2006/307229
§ 371 (c)(1),
(2), (4) Date: Oct. 15, 2007

(87) PCT Pub. No.: WO2006/115003
PCT Pub. Date: Nov. 2, 2006

(65) Prior Publication Data
US 2009/0028484 A1     Jan. 29, 2009

(30) Foreign Application Priority Data

Apr. 18, 2005   (JP) ................................ 2005-119594
Apr. 20, 2005   (JP) ................................ 2005-122812

(51) Int. Cl.
*F16C 33/58* (2006.01)

(52) U.S. Cl.
USPC ......................................... 384/571; 384/564

(58) Field of Classification Search
USPC ......... 384/571, 459, 564, 569, 513, 515, 462, 384/544, 589
See application file for complete search history.

(56) References Cited

U.S. PATENT DOCUMENTS

| | | | |
|---|---|---|---|
| 1,927,534 A * | 9/1933 | Wooler | 384/474 |
| 2,851,315 A | 9/1958 | Zavoda | |
| 3,672,735 A | 6/1972 | Keller et al. | |
| 3,741,614 A * | 6/1973 | Judge | 384/459 |
| 4,728,204 A * | 3/1988 | Colanzi et al. | 384/572 |
| 5,362,159 A * | 11/1994 | Kufner et al. | 384/484 |
| 5,462,367 A * | 10/1995 | Davidson et al. | 384/459 |
| 5,492,419 A | 2/1996 | Miller et al. | |
| 5,588,752 A * | 12/1996 | Fetty | 384/477 |

(Continued)

FOREIGN PATENT DOCUMENTS

| | | |
|---|---|---|
| EP | 0 697 533 | 3/2005 |
| JP | 5-30558 | 4/1993 |

(Continued)

*Primary Examiner* — Alan B Waits
(74) *Attorney, Agent, or Firm* — Clark & Brody

(57) ABSTRACT

A flange part of an inner ring member (11) used in a roller bearing has a thin-wall part (13) having a relatively small diameter direction thickness on its end face side, and a thick-wall part (14) having a relatively large diameter direction thickness on its center side, and an inner diameter surface has a contact part (15) fitted to a shaft at its center part, a non-contact part (16) apart from the shaft in a diameter direction at its outer edge, and a ridge line part (17) positioned on the boundary between the contact part (15) and the non-contact part (16). The axial direction width $L_1$ of the thin-wall part (13) from an end face (12) of the inner ring member (11) and the axial direction distance $L_2$ between the end face (12) and a ridge line part (17) of the inner ring member (11) have a relation of $L_1 > L_2$.

5 Claims, 9 Drawing Sheets

(56) References Cited

U.S. PATENT DOCUMENTS

| | | | |
|---|---|---|---|
| 6,033,117 A * | 3/2000 | Cariveau et al. | 384/94 |
| 6,126,321 A * | 10/2000 | Fetty et al. | 384/459 |
| 6,293,704 B1 * | 9/2001 | Gradu | 384/557 |
| 6,328,478 B1 * | 12/2001 | Fukuda et al. | 384/475 |
| 6,561,559 B1 * | 5/2003 | Skiller et al. | 295/36.1 |
| 7,175,351 B2 * | 2/2007 | Ono et al. | 384/571 |
| 2003/0094849 A1 * | 5/2003 | Joki et al. | 301/105.1 |
| 2004/0131297 A1 * | 7/2004 | Leimann | 384/571 |

FOREIGN PATENT DOCUMENTS

| | | |
|---|---|---|
| JP | 5-187438 | 7/1993 |
| JP | 6-17824 | 1/1994 |
| JP | 2000-052986 | 2/2000 |
| JP | 2001-027254 | 1/2001 |
| JP | 2001-254735 | 9/2001 |
| JP | 2001-354136 | 12/2001 |
| JP | 2003-4035 | 1/2003 |
| JP | 2004-11715 | 1/2004 |
| JP | 2004-84938 | 3/2004 |

* cited by examiner

ROLLER BEARING AND BEARING STRUCTURE

TECHNICAL FIELD

The present invention relates to a roller bearing and a bearing structure and more particularly, to a roller bearing and a bearing structure supporting a shaft to which great bending moment is applied.

BACKGROUND ART

Conventionally, as a bearing that supports an axle for a railway car, a double row cylindrical bearing and a back-to-back (referred to as "outward" hereinafter) double row tapered roller bearing are used in many cases.

Since high load is applied to the axle for the railway car during running, while the axle rotates, bending in a direction perpendicular to a rotation axis is generated. At this time, small sliding (referred to as "fretting" hereinafter) is generated between the axle and the inner ring of the bearing supporting the axle, which causes the problem that the inner peripheral surface end of the inner ring interferes with the axle and a scar is generated in the outer peripheral surface of the axle (referred to as "axle scar" hereinafter). Conventionally, in order to avoid the above problem, a railway car axle supporting structure in which measures shown in FIG. 1 are taken, for example has been known. A double row tapered roller bearing 1 supporting an axle 10 for a railway car comprises an inner ring 2 having flange parts at both ends, an outer ring 3, tapered rollers 4 arranged between the inner ring 2 and the outer ring 3 in double rows, a retainer 5 retaining the intervals of the tapered rollers 4, and an oil seal case 6 and an oil seal 7 for sealing both ends thereof.

A groove 10a is formed at a part corresponding to an inner peripheral surface end 2a of the inner ring 2, in the outer peripheral surface of the axle 10. Thus, the inner peripheral surface end 2a of the inner ring 2 can be prevented from interfering with the axle when the bending is generated. This can be applied to a double row cylindrical roller bearing.

Here, since the double row tapered roller bearing 1 is the outward bearing in which the small diameter side ends of the tapered rollers 4 abut on each other, the inner ring 2 is a split inner ring in which two inner ring members abut on each other. In another case, a filler piece is further provided between the two inner ring members.

FIG. 2 is an enlarged view showing one of the split inner ring at an abutment part S in FIG. 1. As shown in FIG. 2, the inner diameter surface of the inner ring 2 comprises a contact part 2b fitted to the axle 10 at its center part, a non-contact part 2c apart from the axle in a diameter direction at its outer edge part, and a ridge line part 2d on the boundary between the contact part 2b and the non-contact part 2c. The ridge line part 2d interferes with the axle 10 when the bending is generated in the axle 10 like the inner peripheral surface end of the inner ring 2. As a result, the axle scar could be generated in the outer peripheral surface of the axle 10 at the abutment part S of the inner ring 2.

Thus, in order to prevent the axle scar from being generated at the abutment part S, a method of reducing the surface pressure of the ridge line part 2d by cutting a shoulder part 2e of the abutment surface of the inner ring 2 has been used as disclosed in Japanese Unexamined Patent Publication No. 2004-84938.

However, it is difficult to provide a groove in the outer peripheral surface of the axle 10 at the part corresponding to the abutment part S in order to prevent the interference between the inner ring 2 and the axle 10 at the abutment part S in addition to the groove 10a at the part corresponding to the bearing end 2a in view of the processing cost of the axle 10.

Therefore, in order to prevent the scar from being generated at the abutment part S, means for preventing the generation of the scar is to be provided on the side of the double row tapered roller bearing 1 like the method disclosed in the Japanese Unexamined Patent Publication No. 2004-84938. However, according to the method disclosed in the above document, the surface pressure reducing effect of the ridge line part 2d is small, so that the generation of the scar of the axle 10 is not satisfactorily prevented.

In addition, according to another example of the bearing supporting the axle for the railway car, as shown in FIG. 3, a double row tapered roller bearing 101 supporting an axle 110 for the railway car comprises an inner ring 102 in which small diameter side ends of two inner ring members abut on each other, an outer ring 103, tapered rollers 104 arranged between the inner ring 102 and the outer ring 103 in double rows, a retainer 105 retaining the intervals of the tapered rollers 104, and a seal 106 sealing both ends thereof.

FIG. 4 is an enlarged view showing one of the inner ring member at an abutment part P in FIG. 3. As shown in FIG. 4, the inner diameter surface of the inner ring 102 has a fit part 102a fitted to the axle 110 at its center part, an insertion guide part 102b at its outer edge part, and a ridge line part 102c on the boundary between the fit part 102a and the insertion guide part 102b.

In a case where bending is generated in the axle 110, for example, as shown in FIG. 3, when the upper side of the axle 110 is bent in the shape of convex and receives tensile stress and the lower side thereof is bent in the shape of concave and receives compressive stress, fretting is generated between the axle 110 and the ridge line part 102c at the part P, which could cause the abrasion and the scar in an outer peripheral surface 110a of the axle 110. Thus, stress concentration occurs at the axle scar, which could cause a serious accident such as the breakdown of the axle.

Thus, in order to prevent the generation of the axle scar at the abutment part P, the method of reducing the surface pressure of the ridge line part 102c by cutting a shoulder part 102d of the abutment surface of the inner ring 102 has been known as disclosed in the Japanese Unexamined Patent Publication No. 2004-84938.

FIG. 5 is an enlarged view showing the vicinity of a part Q of the double row tapered roller bearing 101 shown in FIG. 3. As shown in FIG. 5, since the inner ring 102 is in contact with the whole region of the end face of a rear lid 107, displacement of the double row tapered roller bearing 101 is limited by the rear lid 107.

Thus, the double row tapered roller bearing 101 cannot follow the displacement of the axle 110 and the contact surface pressure of the ridge line part 102c is increased when the axle 110 is bent in a radial direction. In addition, the surface pressure reducing effect is not provided sufficiently only by thinning the shoulder part 102d of the abutment surface of the inner ring 102. Therefore, it means that there still exists the problem that the abrasion and the axle scar caused by the fretting between the ridge line part 102c and the axle 110 could be generated. In addition, this problem could occur at the contact part between the inner ring 102 and an oil thrower 108.

DISCLOSURE OF THE INVENTION

Thus, it is an object of the present invention to provide a roller bearing capable of effectively avoiding the generation of an axle scar caused by the interference between an inner ring and a shaft.

Thus, it is another object of the present invention to provide a bearing structure capable of effectively avoiding the generation of abrasion and an axle scar caused by the fretting between an inner ring and a shaft.

A roller bearing according to the present invention comprises an inner ring having a flange part at one or both ends, an outer ring, and rollers arranged between the inner ring and the outer ring. The flange part of the inner ring has a thin-wall part having a relatively small diameter direction thickness on its end face side, and a thick-wall part having a relatively large diameter direction thickness on its center side, and the inner diameter surface of the inner ring has a contact part fitted to a shaft at its center part, a non-contact part apart from the shaft in the diameter direction at its outer edge, and a ridge line part positioned on the boundary between the contact part and the non-contact part. The axial direction width $L_1$ of the thin-wall part from the end face the inner ring and the axial direction distance $L_2$ between the end face and the ridge line part of the inner ring have a relation of $L_1 > L_2$.

According to the above constitution, the surface pressure of the ridge line part can be reduced by thinning the part including the ridge line part of the inner ring. As a result, even when the ridge line part interferes with the shaft, the axle scar can be prevented from being generated.

Preferably, the thin-wall part is formed by providing a peripheral groove having the same axial direction depth from the end face of the inner ring as the axial direction width $L_1$. In addition, preferably, the inner ring has a notch leading from its inner diameter surface to the peripheral groove.

The effect provided by thinning the inner ring can be also provided by forming the peripheral groove in the end face. In this case, when the peripheral groove is filled with a lubricant agent, since the lubricant agent can be supplied to the part between the inner diameter surface of the inner ring and the shaft through the notch, the axle scar and fretting of the small flange end face of the inner ring can be prevented.

Preferably, the axial direction distance $L_2$ is within a range of $1\ mm \leq L_2 \leq 5\ mm$. The non-contact part of the inner diameter surface of the inner ring functions as an insertion guide surface when the inner ring is press fitted to the axle. Therefore, when the non-contact part is small, the function as the insertion guide surface is lowered and the inner ring and the corner part of the axle interfere with each other at the time of press fitting and the axle or the inner diameter surface of the inner ring could be damaged. Meanwhile, when the non-contact part is large, the surface pressure of the ridge line part is increased because the inner ring expands when the inner ring is press fitted to the axle. Thus, according to the above constitution, the appropriate function as the insertion guide surface of the non-contact part can be ensured.

In addition, the diameter direction thickness $L_3$ of the thin-wall part at the ridge line part and the inner diameter $\phi$ of the inner ring preferably have a relation of $0.04 \leq L_3/\phi \leq 0.1$. When $L_3/\phi < 0.04$, since the rigidity of the thin-wall part becomes too low, the load applied to the inner ring exceeds the maximum allowable stress, causing the bearing to be damaged. Meanwhile, $L_3/\phi > 0.1$, it is difficult to provide the surface pressure reducing effect at the ridge line part. Thus, according to the above constitution, while the strength of the bearing is maintained, the surface pressure reducing effect can be sufficiently provided to prevent the generation of the axle scar.

A double row tapered roller bearing according to the present invention comprises an inner ring comprising two abutted inner ring members having a flange part at one or both ends, an outer ring, and tapered rollers arranged between the inner ring and the outer ring in double rows. The flange part of the inner ring member has a thin-wall part having a relatively small diameter direction thickness on its end face side, and a thick-wall part having a relatively large diameter direction thickness on its center side. The inner diameter surface of the inner ring member has a contact part fitted to a shaft at its center part, a non-contact part apart from the shaft in the diameter direction at its outer edge, and a ridge line part positioned on the boundary between the contact part and the non-contact part.

Thus, the axial direction width $L_1$ of the thin-wall part from the end face of the inner ring member and the axial direction distance $L_2$ between the end face and the ridge line part of the inner ring member have a relation of $L_1 > L_2$.

Thus, when the part including the ridge line part of the inner ring is thinned at the flange part of the end face of the double row tapered roller bearing and at the flange part of the inner ring abutment part, the surface pressure of the ridge line part can be reduced without forming the groove in the shaft. As a result, even when the ridge line part interferes with the shaft, the scar can be prevented from being generated.

According to the present invention, since the surface pressure of the ridge line part in the inner diameter surface of the inner ring can be reduced, even when the ridge line part interferes with the shaft, the roller bearing can prevent the generation of the axle scar.

A bearing structure according to the present invention comprises a shaft, a bearing inner ring fitted to the shaft, and an abutment member abutting on the end face of the bearing inner ring and fitted to the shaft, and the end face of the abutment member has a contact part being in contact with the end face of the bearing inner ring on the inner side in its diameter direction, and a non-contact part not being in contact with the end face of the bearing inner ring, at a position retreating from the contact part in an axial direction on the outer side in the diameter direction. In addition, the diameter direction width $w_1$ of the end face of the bearing inner ring and the diameter direction width $w_2$ of the contact part have a relation of $w_2/w_1 \leq 0.5$.

According to the above constitution, since the bearing inner ring can be displaced to some extent without being limited by the abutment member, even when the shaft is bent, the contact surface pressure at the contact part between the shaft and the bearing inner ring can be prevented from being increased. As a result, the abrasion and axle scar caused by fretting can be prevented from being generated.

Preferably, the inner diameter dimension d of the bearing inner ring and the diameter direction dimension D to the upper end of the contact part have a relation of $D/d \geq 1.1$. When the area of the non-contact part is increased, the displacement width of the bearing inner ring is increased, so that even when the shaft is largely bent, the contact surface pressure between the shaft and the bearing inner ring can be prevented from being increased.

However, since the area of the contact part is decreased in proportion to the increase in area of the non-contact part, it is concerned that the contact surface pressure between the bearing inner ring and the abutment member is increased and abrasion and the like is generated between them. Thus, when the inner diameter dimension d of the bearing inner ring and the diameter direction dimension D to the upper end of the contact part have the relation of $D/d \geq 1.1$, the above problem can be solved.

Preferably, the axial direction distance between the bearing inner ring and the abutment member at the upper end of the non-contact part is not less than 0.5 mm. Thus, even when the bearing inner ring is displaced following the bending of the shaft, the contact with the abutment member can be prevented.

The end face of the non-contact part is parallel to the end face of the contact part. Thus, the non-contact part can be easily processed by a turning process and the like.

Preferably, the bearing inner ring is in contact with the abutment member with a heterogeneous material between them at the contact part. In addition, the heterogeneous material preferably has hardness lower than those of the inner ring and the abutment member. When the heterogeneous material having hardness lower than those of both inner ring and abutment member is sandwiched between them, even in the case where the contact surface pressure is increased, the abrasion due to fretting can be prevented from being generated between both members.

According to the present invention, since the bearing can be displaced following the shaft bending, the surface pressure at the ridge line part of the inner diameter surface of the inner ring can be reduced, so that even when the ridge line part interferes with the shaft, the bearing structure can prevent the axle scar from being generated.

BEST MODE FOR CARRYING OUT THE INVENTION

Figure 1:
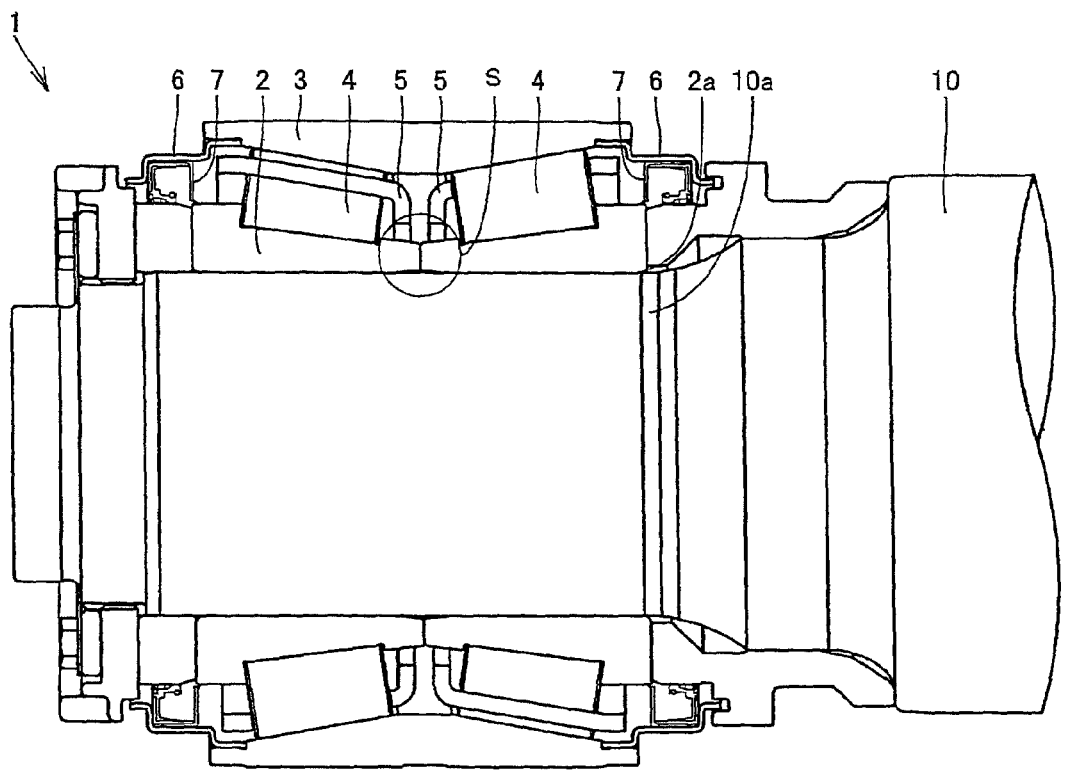
FIG. 1 is a view showing one example of a double row tapered roller bearing supporting an axle for a railway car.

Similar to the double row tapered roller bearing 1 as shown in FIG. 1, a tapered roller bearing according to one embodiment of the present invention comprises an inner ring in which small diameter side end faces of two inner ring members having flange parts at both ends abut on each other, an outer ring, tapered rollers disposed between the inner ring and the outer ring in double rows, a retainer retaining the intervals of the tapered rollers, and an oil seal case and an oil seal for seating both end faces, and it is an outward bearing in which the small diameter side ends of the tapered rollers abut on each other.

Figure 6A:
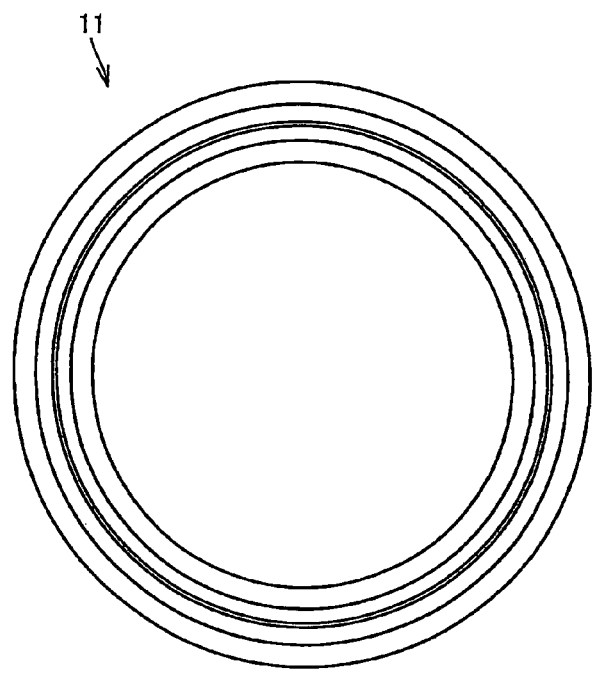
FIG. 6A is a front view showing an inner ring member for a double row tapered roller bearing according to one embodiment of the present invention.
Figure 6B:
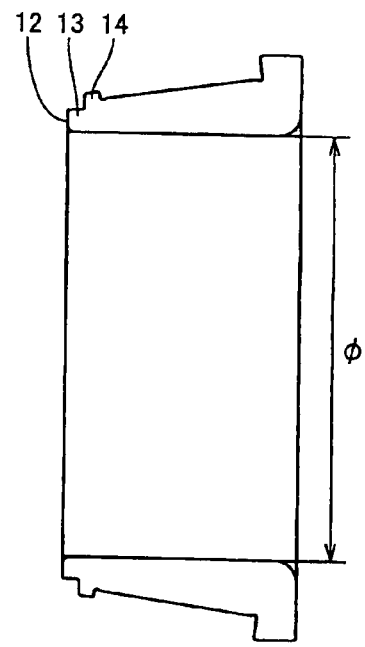
FIG. 6B is a side sectional view showing the inner ring member for the double row tapered roller bearing according to one embodiment of the present invention.
Figure 7:
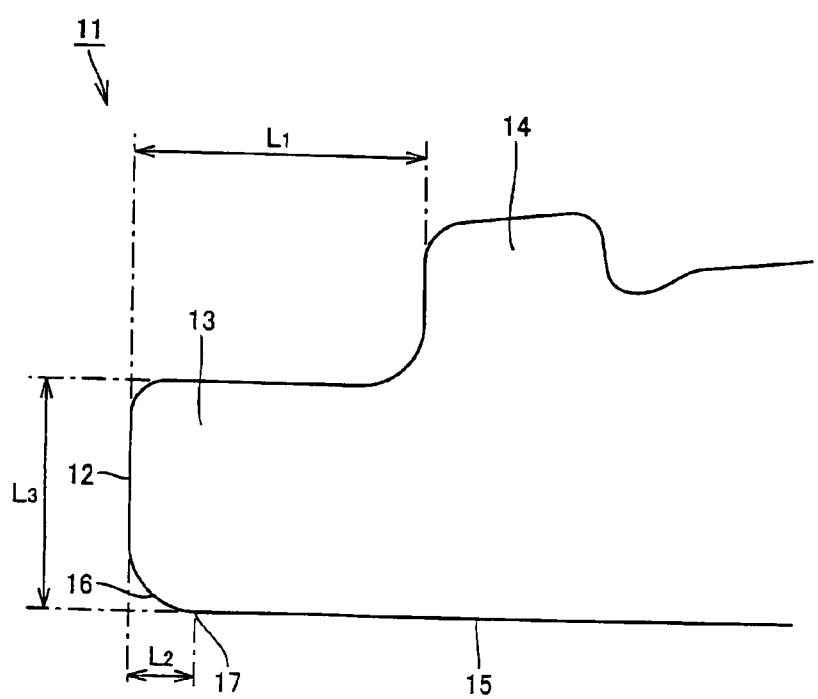
FIG. 7 is an enlarged view showing a flange part of the inner ring member of the double row tapered roller bearing shown in FIGS. 6A and 6B.

As shown in FIGS. 6A, 6B and 7, an inner ring member 11 used in this double row tapered roller bearing comprises a thin-wall part 13 having a relatively small diameter direction thickness on the side of an end face 12, a thick-wall part 14 having a relatively large diameter direction thickness on the side of center, and its inner diameter surface comprises a contact part 15 fitted to an axle at its center part, a non-contact part 16 apart from the axle in the diameter direction at its outer edge part, and a ridge line part 17 positioned on the boundary between the contact part 15 and the non-contact part 16.

Thus, the axial direction width $L_1$ of the thin-wall part 13 from the end face 12 of the inner ring member 11 and the axial direction distance $L_2$ from the end face 12 of the inner ring member 11 to the ridge line part 17 satisfies the relation of $L_1 > L_2$.

According to the above constitution, since the part including the ridge line part 17 at a flange part is thinned, the surface pressure of the ridge line part 17 can be reduced without forming a groove in the axle. As a result, even when the ridge line part 17 interferes with the axle, the axle scar is prevented from being generated.

More specifically, the axial direction distance $L_2$ is set within a range of $1 \text{ mm} \leq L_2 \leq 5 \text{ mm}$. The non-contact part 16 of the inner diameter surface of the inner ring functions as an insertion guide surface when the inner ring is pressed into the axle. Therefore, when the non-contact part 16 is small, the function as the insertion guide surface is lowered and the inner ring and the corner part of the axle interfere with each other at the time of press fitting, which could damage the axle or the inner diameter surface of the inner ring. Meanwhile, when the inner ring is press fitted to the axle, the inner ring expands in the diameter direction. Thus, when the non-contact part 16 is large, the surface pressure of the ridge line part 17 is increased. Thus, according to the above constitution, the non-contact part 16 can ensure the function as the insertion guide surface.

Furthermore, the relation between the thickness $L_3$ of the thin-wall part 13 in the diameter direction at the ridge line part 17 and the inner diameter $\phi$ of the inner ring is set within a range of $0.04 \leq L_3/\phi \leq 0.1$. When $L_3/\phi < 0.04$, since the thin-wall part 13 is too low in rigidity, the load applied to the inner ring 11 exceeds maximum allowable stress, which causes the damage of the bearing. Meanwhile, when $L_3/\phi > 0.1$, it is hard to provide the surface pressure reducing effect of the ridge line part 17. Thus, according to the above constitution, while the strength of the bearing is maintained, the surface pressure reducing effect to prevent the axle scar from being generated can be satisfactorily provided.

In addition, the ridge line part 17 is rounded through a rounding process. In addition, the rounding processed part desirably has a curvature radius of 1 mm or more. Thus, even when the ridge line part 17 interfere with the axle, since the stress concentration can be relieved, the axle scar can be more effectively prevented from being generated.

Next, an inner ring member 21 used in the double row tapered roller bearing according to another embodiment of the present invention will be described with reference to FIGS. 8A, 8B and 9.

At a flange part of the inner ring member 21, a thin-wall part is formed by forming a peripheral groove 23 having a depth of $L_1$ from an end face 22 in the axial direction and a thick-wall part 24 is formed on the center side. In addition, similar to FIGS. 6A and 6B, its inner diameter surface has a contact part 25, a non-contact part 26 and a ridge line part 27 at an axial direction distance $L_2$ from the end face 22 of the inner ring member 21. Here, the relation between $L_1$ and $L_2$ is such that $L_1 > L_2$.

Thus, when the peripheral groove 23 is provided in the end face 22, the surface pressure of the ridge line part 27 can be reduced similar to the case where the flange part is thinned.

More specifically, similar to the above embodiment, by setting the axial direction distance $L_2$ within a range of 1 to 5 mm and/or setting the relation between the diameter direction thickness $L_3$ at the ridge line part 27 in which the peripheral groove 23 serving as the thin-wall part is provided, and the inner diameter $\phi$ of the inner ring such that $L_3/\phi = 0.04$ to 0.1, the surface pressure reducing effect for preventing the axle scar from being generated is satisfactorily provided.

In addition, similar to the above embodiment, the ridge line part 27 is rounded through a rounding process. In addition, the rounding processed part is desirably has a curvature radius of 1 mm or more. Thus, even when the ridge line part 27 interferes with the axle, since the stress concentration can be relieved, the axle scar can be more effectively prevented from being generated.

Figure 8A:
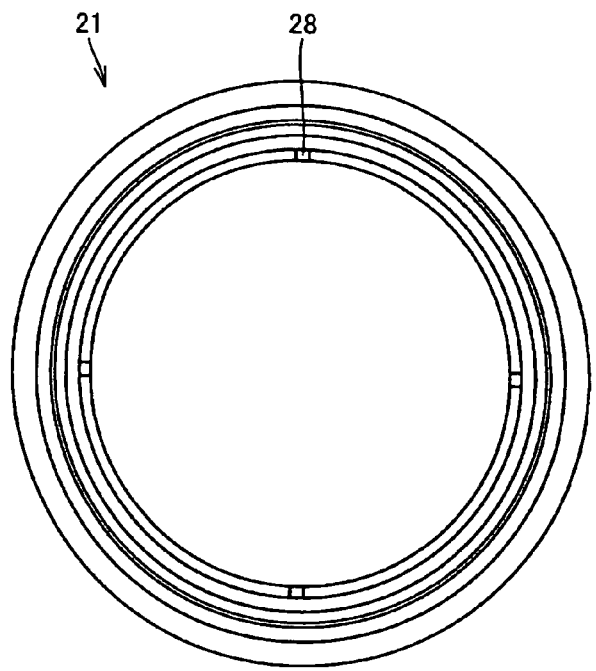
FIG. 8A is a front view showing an inner ring member of a double row tapered roller bearing according to another embodiment of the present invention.
Figure 8B:
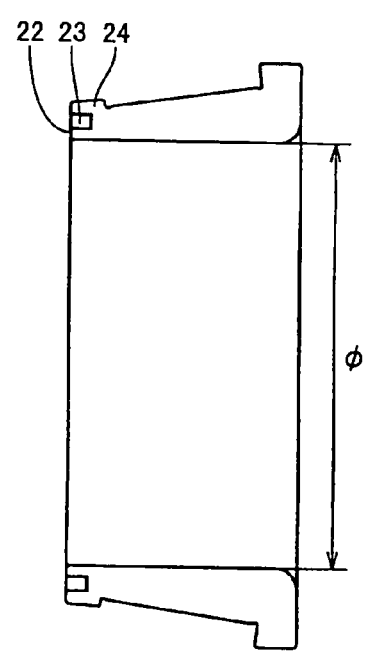
FIG. 8B is a side sectional view showing the inner ring member of the double row tapered roller bearing according to another embodiment of the present invention.
Figure 9:
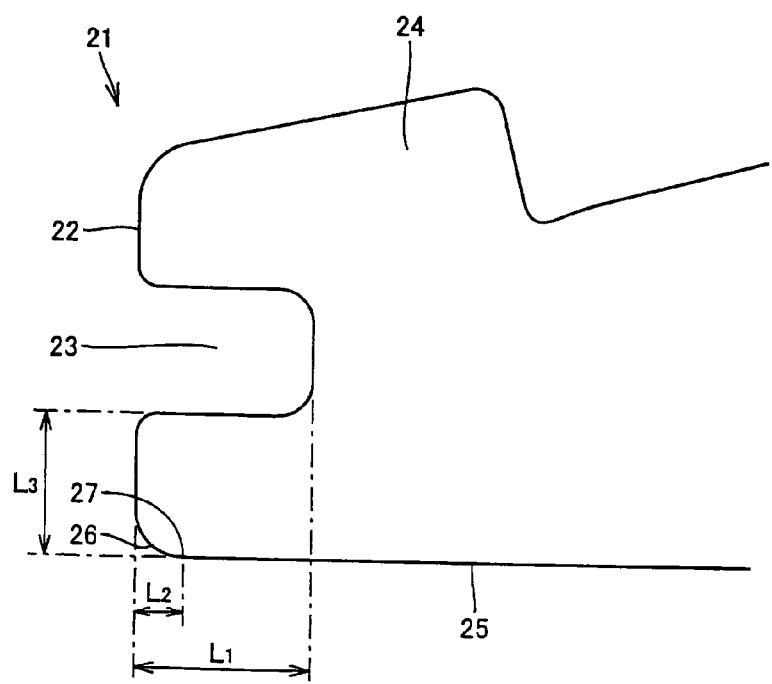
FIG. 9 is an enlarged view showing a flange part of the inner ring member of the double row tapered roller bearing shown in FIGS. 8A and 8B.

As shown in FIGS. 8A and 8B, since notches 28 are provided in the inner ring member so as to lead from its inner diameter surface to the peripheral groove 23, when the peripheral groove 23 is filled with a lubricant agent, the lubricant agent can be supplied between the inner diameter surface of the inner ring and the axle through the notches 28. Thus, the scar is prevented from being generated in the axle and fretting is prevented from being generated at the small flange end face of the inner ring.

In addition, although the notches 28 are provided at four parts in the inner diameter surface of the inner ring as shown in FIGS. 8A and 8B, since the present invention is not limited to this, any number of notches 28 may be provided.

The present invention may be applied to the small diameter side end of the inner ring or may be applied to the large diameter side end of the inner ring. In addition, although the case where the flange parts are provided at both ends of the inner ring member is illustrated in the above embodiment, the present invention is not limited to this. For example, the inner ring member may have a flange part on at least one side.

Although the case where the present invention is applied to the double row tapered roller bearing is illustrated in the above each embodiment, the present invention may be applied to a double row cylindrical roller bearing. Furthermore, the present invention may be applied to not only the double row but also a single row tapered roller bearing or cylindrical roller bearing.

In addition, although the above each embodiment illustrates the outward bearing in which the small diameter side ends of the tapered rollers abut on each other, the present invention is not limited to this and may be applied to a face to face bearing in which the large diameter side ends of the tapered rollers abut on each other (referred to as the "inward bearing" hereinafter). In this case, since the inner ring of the inward bearing is integral in general, the present invention is applied to the ridge line part of the inner ring end.

Figure 2:
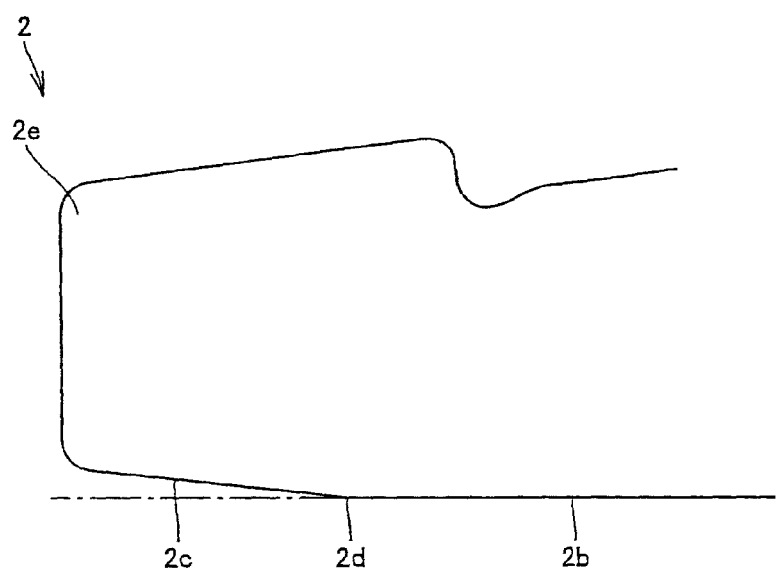
FIG. 2 is an enlarged view showing a flange part of an inner ring member of the double row tapered roller bearing shown in FIG. 1.
Figure 10:
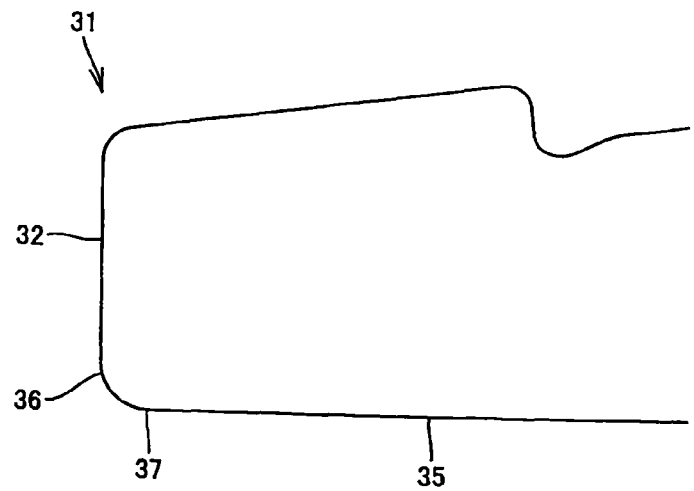
FIG. 10 is an enlarged view showing a flange part of an inner ring member of a double row tapered roller bearing used as a comparison example to confirm the effect of the present invention.

Next, in order to confirm the effect of the present invention, surface pressures at (1) the ridge line part 2d of the conventional inner ring 2 as shown in FIG. 2, (2) the ridge line part 17 of the inner ring member 11 according to one embodiment of the present invention as shown in FIG. 7, and (3) a ridge line part 37 of an inner ring member 31 as shown in FIG. 10 when the bending was generated were found by a finite element method.

FIG. 10 is an enlarged view showing a flange part of the inner ring member 31 used in the tapered roller bearing that is to be compared with the conventional inner ring 2 as shown in FIG. 2 and the inner ring member 11 according to one embodiment of the present invention as shown in FIG. 7.

The inner diameter surface of the inner ring member 31 shown in FIG. 10 comprises a contact part 35, a non-contact part 36, and the ridge line part 37 positioned on the boundary between the contact part 35 and the non-contact part 36.

According to this inner ring member 31, the distance between an end face 32 and the ridge line part 37 is about ⅕ of the distance of the conventional inner ring 2 shown in FIG. 2 and a thin-wall part is not provided in the vicinity of the end face 32 unlike the inner ring member 11 shown in FIG. 7.

In addition, the surface pressure causing the axle scar was determined as 140[MPa] in view of an analysis error and the like. One example of a calculated result is shown in FIG. 11.

Figure 11:
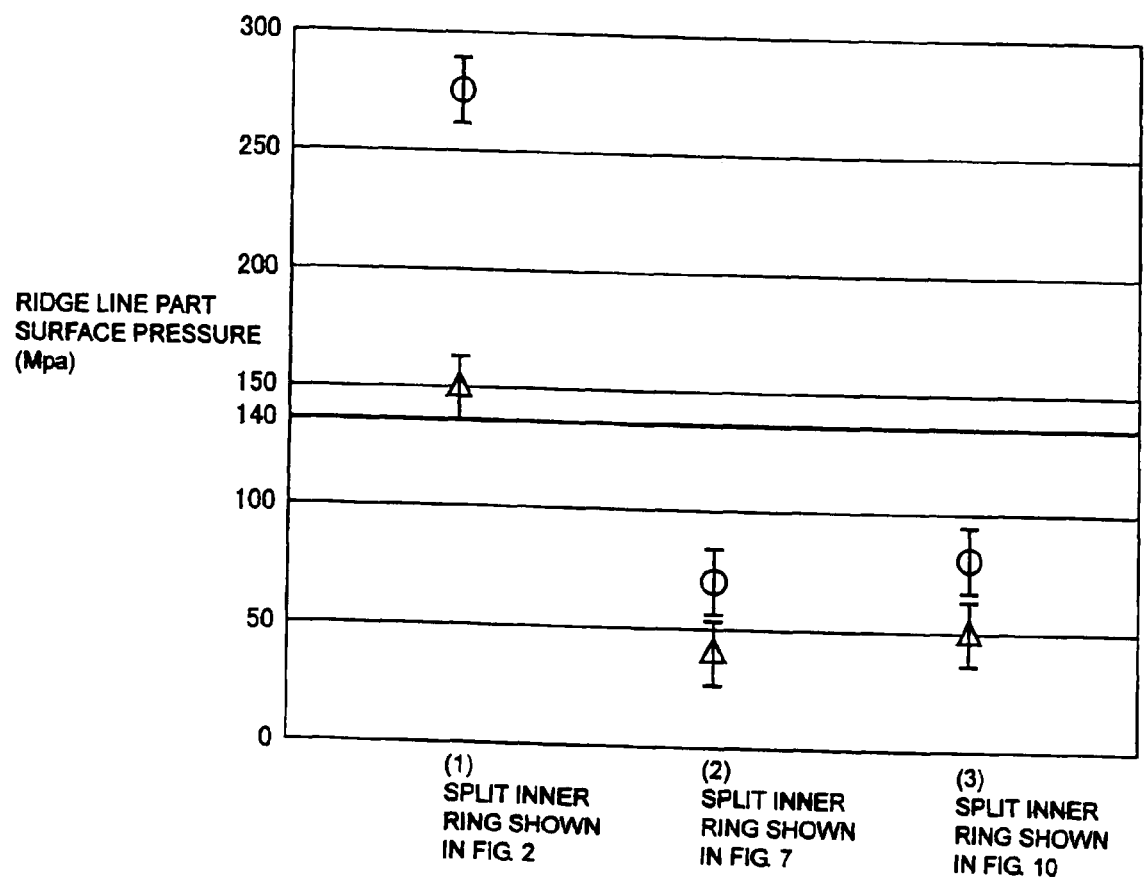
FIG. 11 is a graph showing a result of surface pressures of the ridge line parts in a conventional inner ring and the inner ring according to the present invention found by a finite element method.

Referring to FIG. 11, only the surface pressure of the ridge line part 2d of the conventional inner ring largely exceeded the threshold value 140[MPa] of axle scar generation. In addition, the surface pressure of the ridge line part 17 of the inner ring member 11 according to the present invention was reduced to 70% or more as compared with the ridge line part 2d of the conventional inner ring 2.

Figure 4:
FIG. 4 is an enlarged view showing the vicinity of a part P in a bearing structure shown in FIG. 3.
Figure 5:
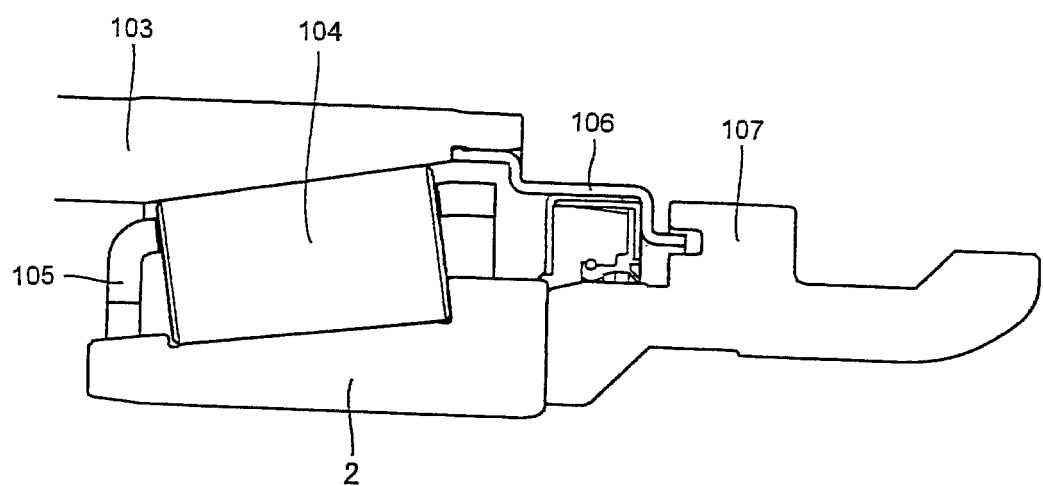
FIG. 5 is an enlarged view showing the vicinity of a part Q in the bearing structure shown in FIG. 3.

Thus, it has been confirmed that more satisfactory surface pressure reducing effect can be provided by positioning the ridge line part at the thin-wall part (as compares with he case where the ridge line part is positioned outside the thin-wall part as shown in FIGS. 4 and 5 in Japanese Unexamined Patent Publication No. 2004-84938).

In addition, it has been confirmed that the surface pressure reducing effect can be provided by bringing the ridge line part 37 close to the end face 32 like the inner ring member 31 shown in FIG. 10 used as the comparison example.

Next, a bearing structure according to one embodiment of the present invention will be described with reference to FIG. 12.

Figure 12:
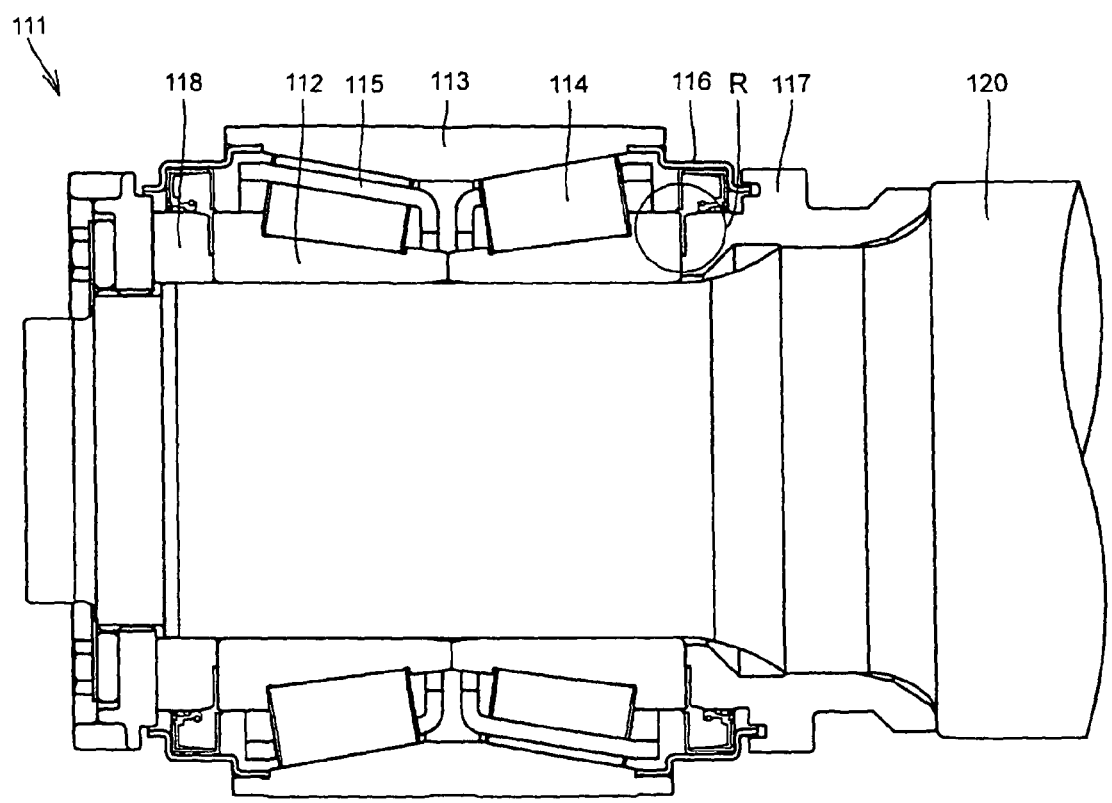
FIG. 12 is a view showing a bearing structure according to one embodiment of the present invention.

The bearing structure shown in FIG. 12 comprises a double row tapered roller bearing 111 supporting an axle 120 for a railway car, a rear lid 117 and an oil thrower 118 abutting on the double row tapered roller bearing 111 and serving as abutment members fixed to the axle 120.

The double row tapered roller bearing 111 comprises an inner ring 112 in which small diameter side ends of two inner ring members abut on each other, an outer ring 113, tapered rollers 114 arranged between the inner ring 112 and the outer ring 113 in double rows, a retainer 115 retaining the intervals of the tapered rollers 114, and a sealing member 116 sealing both ends of the bearing, and it is the outward bearing in which the small diameter side ends of the tapered rollers 114 abut on each other.

Figure 13:
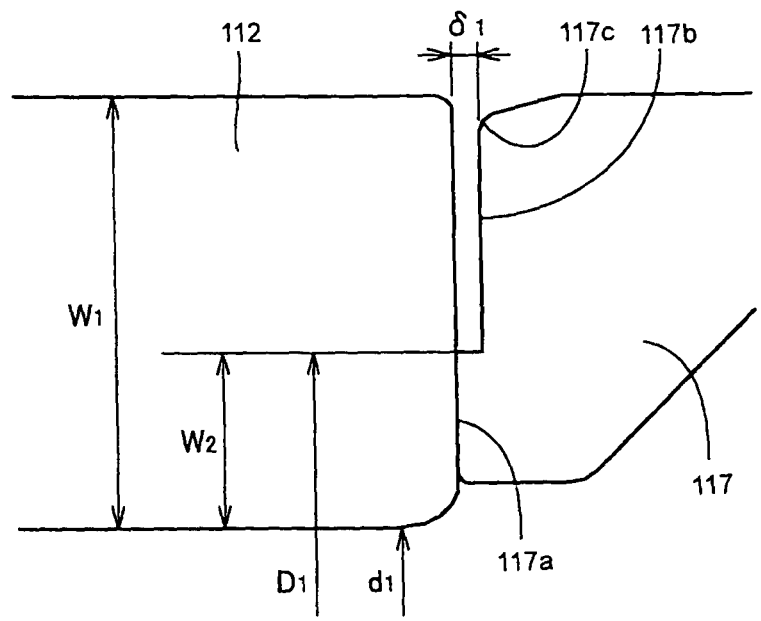
FIG. 13 is an enlarged sectional view showing the vicinity of a part R in FIG. 12, in which the end face of a contact part is parallel to the end face of a non-contact part.

In addition, FIG. 13 is an enlarge view showing the vicinity of a part R in FIG. 12. Referring to FIG. 13, the end face of the rear lid 117 opposed to the end face of the inner ring 112 comprises a contact part 117a that is in contact with the end face of the inner ring 112 on the inner side of its diameter direction, and a non-contact part 117b that is not in contact with the end face of the bearing inner ring 112 at a position retreated from the contact part 117a in its axial direction, on the outer side of its diameter direction. Thus, the diameter direction width $w_1$ of the end face of the inner ring 112 and the diameter direction width $w_2$ of the contact part 117a have the relation of $w_2/w_1 \leq 0.5$.

According to the above constitution, since the inner ring 112 can be displaced to some extent without being limited by the rear lid 117, even when the axle 120 is bent, the surface pressure at the contact part between the axle 120 and the inner ring 112 can be prevented from being increased. As a result, abrasion and axle scar caused by fretting are prevented from being generated.

In addition, as shown in FIG. 13, the inner diameter dimension $d_1$ of the inner ring 112 and the diameter direction dimension $D_1$ to the upper end of the contact part 117a have the relation of $D_1/d_1 \geq 1.1$. When the area of the non-contact part 117b is increased, the displacement width of the inner ring 112 is increased. Thus, even when the bending amount of the axle 120 is increased, the contact surface pressure between the axle 120 and the inner ring 112 can be prevented from being increased.

However, since the area of the contact part 117a is decreased in proportion to the increase of the area of the non-contact part 117b, it is concerned that the contact surface pressure between the inner ring 112 and the rear lid 117 is increased considerably and the abrasion is generated between both members. Thus, since the inner diameter dimension $d_1$ of the inner ring 112 and the diameter direction dimension $D_1$ to the upper end of the contact part 117a have the relation of $D_1/d_1 \geq 1.1$, the above problem can be solved.

Furthermore, the axial direction distance $\delta_1$ between the inner ring 112 and the rear lid 117 at the upper end of the non-contact part 117b is such that $\delta_1 \geq 0.5$ mm. Thus, even when the inner ring 112 is displaced following the bending of the axle 120, it is prevented from coming in contact with the rear lid 117.

The end face of the non-contact part 117b is parallel to the end face of the contact part 117a as shown in FIG. 13. The non-contact part 117a is advantageous in that it can be easily processed by a turning process and the like. However, when the axle 120 is largely bent, the end face of the inner ring 112 could be in contact with a corner part 117c of the non-contact part 117b. In this case, since the contact surface pressure at the contact part becomes very high, the end face of the inner ring 112 could become worn.

Figure 14:
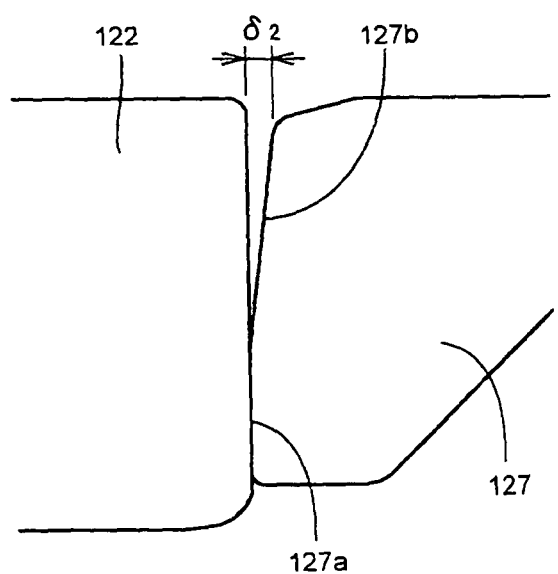
FIG. 14 is an enlarged sectional view showing the vicinity of the part R in FIG. 12, in which the end face of a non-contact part is tapered.
Figure 15:
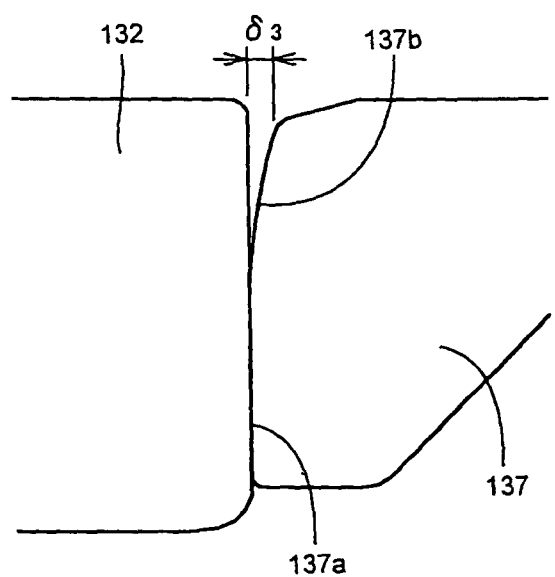
FIG. 15 is an enlarged sectional view showing the vicinity of the part R in FIG. 12, in which the end face of a non-contact part is curved.

Thus, as shown in FIG. 14, it may be such that a contact part 127a between an inner ring 122 and a rear lid 127 is a flat surface and a non-contact part 127b is tapered so as to expand outward in the diameter direction. In another case, as shown in FIG. 15, it may be such that a contact part 137a between an inner ring 132 and a rear lid 137 is a flat surface and a non-contact part 137b is in the shape of a convex sphere. According to both embodiments shown in FIGS. 14 and 15, even when the inner ring end face and the non-contact part are in contact with each other, since the contact surface pressure at the contact part is small, the inner ring end face can be prevented from being worn away.

In addition, according to both embodiments shown in FIGS. 14 and 15, although the axial direction distances between the inner rings and the rear lids at the non-contact parts are not constant, it is preferable to satisfy that $\delta_2 \geq 0.5$ mm and $\delta_3 \geq 0.5$ mm at the upper ends of the non-contact parts, respectively. In addition, the ratio between the diameter direction width of the end face of the inner ring and the diameter direction width of the contact part, and the ratio between the inner diameter dimension of the inner ring and the diameter direction dimension to the upper end of the contact part are the same as the embodiment shown in FIG. 13.

Figure 3:
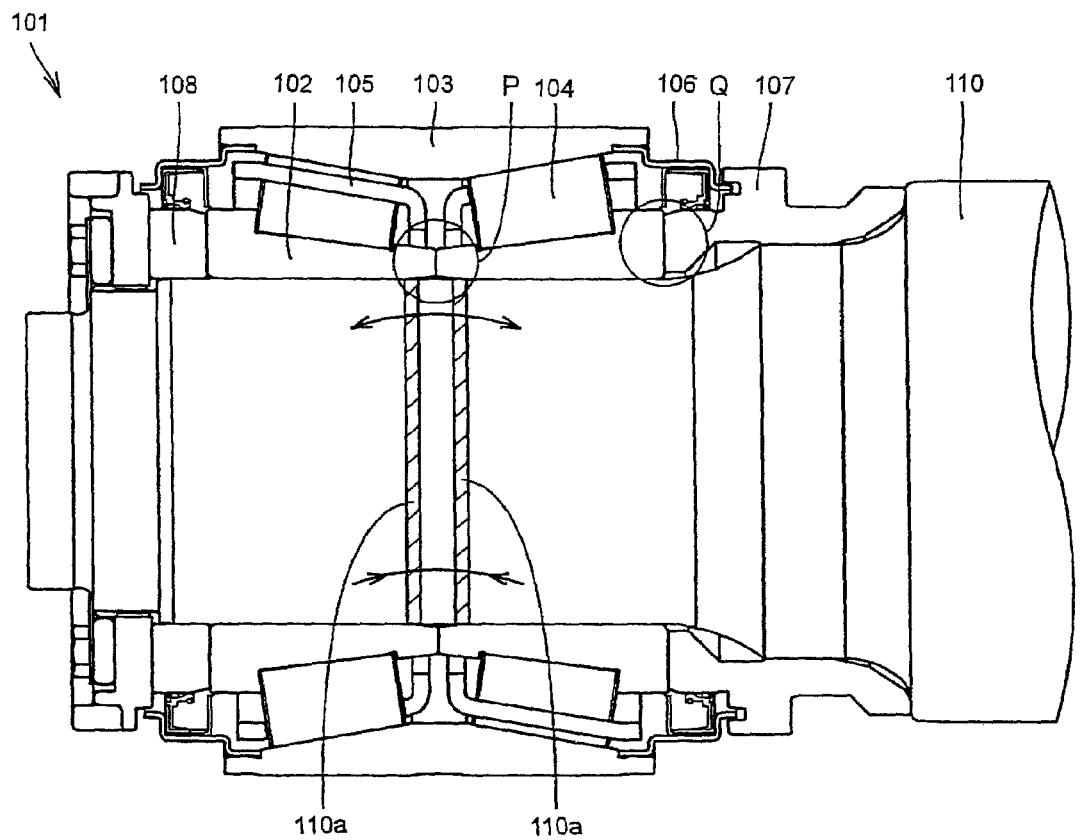
FIG. 3 is a view showing another example of the double row tapered roller bearing supporting an axle for a railway car.

A test was performed using the conventional bearing structure as shown in FIGS. 3 to 5 and the bearing structure according to one embodiment of the present invention as shown in FIGS. 12 and 13 in order to confirm the effect of the present invention. The result is shown in Table 1.

TABLE 1

EFFECT CONFIRMING TEST RESULT

| Bearing structure | Test time (hour) | Axle scar | Axle scar position |
|---|---|---|---|
| Conventional one | 1000 | Generated | In the vicinity of inner ring small diameter side ridge line part (FIG. 1) |
| Inventive one | 1000 | Not generated | — |

As a result, the axle scar was generated on the axle surface 110a at the part corresponding to the small diameter side ridge line part 102c of the conventional inner ring 102. Meanwhile, the axle scar was not generated even after 1000 hours in the inventive bearing structure. Thus, it has been confirmed that the present invention can prevent the generation of the abrasion and axle scar caused by the fretting.

Furthermore, the inner ring and the rear lid are preferably in contact with a heterogeneous member between them. Here, the heterogeneous member is to be a material having hardness lower than those of the inner ring and the rear lid. For example, it is to be soft metal such as a copper alloy, or a self-lubricating resin such as a fluorine resin, or a porous material such as a sintered material of a contained alloy. Thus, even when the contact surface pressure between the bearing inner ring and the abutment member is increased, both members can be prevented from being worn away due to the fretting.

Although the present invention is applied to the double row tapered roller bearing in the above embodiment, the present invention is not limited to this. For example, the present invention can be applied to both rolling bearing and sliding bearing such as a four-point contact ball bearing, an angular ball bearing, a deep groove ball bearing, a cylindrical roller bearing, a self-aligning roller bearing, and a liquid lubricating bearing.

In addition, although the contact part and the non-contact part are provided at the abutment part between the inner ring and the rear lid in the above embodiment, the present invention may be applied to the abutment part between the inner ring and the oil thrower.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

The present invention can be advantageously applied to a roller bearing and a bearing structure supporting a shaft to which great bending moment is applied, such as an axle for a railway car.

The invention claimed is:

1. A double row tapered roller bearing comprising:
an inner ring comprising two abutted inner ring members having a flange part at one end of each inner ring member or a flange part at each end of each inner ring member;
an outer ring; and
tapered rollers arranged between said inner ring and said outer ring in double rows, wherein
the flange part at the one end or both ends of each said inner ring member has a thin-wall part having a diameter direction thickness on an end face side thereof, and a thick-wall part having a diameter direction thickness on a center side of the inner ring, the diameter direction thickness of the thin-wall part being less than the diameter direction thickness of the thick-wall part, wherein the diameter direction difference between the thin wall part and the thick wall part is located on an outer radial side of the inner ring member,
the inner diameter surface of said inner ring member has a contact part fitted to a shaft at a center part thereof, a non-contact part apart from the shaft in the diameter direction at an outer edge of the inner ring, and a ridge line part positioned on a boundary between said contact part and said non-contact part, and
the axial direction width $L_1$ of said thin-wall part measured from the end face of said inner ring member and the axial direction distance $L_2$ between the end face and said ridge line part of said inner ring member have a relation of $L_1 > L_2$, and further wherein the flange part includes an outer surface that extends from the end face of the inner ring, the outer surface extending linearly from the end face of the inner ring to a recess sized to receive the roller.

2. A roller bearing comprising:
an inner ring having a flange part at one end or a flange part at each end of the inner ring;
an outer ring; and
rollers arranged between said inner ring and said outer ring, wherein
the flange part of said inner ring at the one end or both ends of the inner ring has a thin-wall part having a diameter direction thickness on an end face side thereof, and a thick-wall part having a diameter direction thickness on a center side thereof, the diameter direction thickness of the thin-wall part being less than the diameter direction thickness of the thick-wall part,
the inner diameter surface of said inner ring has a contact part fitted to a shaft at a center part thereof, a non-contact part apart from the shaft in the diameter direction at an outer edge of the inner ring, and a ridge line part positioned on a boundary between said contact part and said non-contact part, and
an axial direction width $L_1$ of said thin-wall part measured from the end face of said inner ring and an axial direction distance $L_2$ between the end face and said ridge line part of said inner ring have a relation of $L_1 > L_2$, wherein said thin-wall part is formed by providing a peripheral groove in a middle portion of the end face of the inner ring, the peripheral groove having an axial direction depth from the end face of said inner ring that is the same as said axial direction width $L_1$ and said inner ring has a notch leading from the inner diameter surface to said peripheral groove, and
further wherein the flange part includes an outer surface that extends from the end face of the inner ring, the outer surface extending linearly from the end face of the inner ring to a recess sized to receive the roller.

3. The roller bearing according to claim 2, wherein said axial direction distance $L_2$ is within a range of 1 mm≤$L_2$≤5 mm.

4. The roller bearing according to claim 2, wherein
the diameter direction thickness $L_3$ of said thin-wall part at said ridge line part and the inner diameter $\phi$ of said inner ring have a relation of $0.04 \leq L_3/\phi \leq 0.1$.

5. The roller bearing of claim 2, wherein the axial direction width $L_1$ of the thin wall part and the axial direction depth of the peripheral groove are measured in the same direction.

* * * * *